Feb. 16, 1926.   1,573,209
J. L. WHEELER
GOVERNOR FOR MEASURING AND COST COMPUTING MACHINES
Filed July 7, 1921    3 Sheets-Sheet 1

Inventor:
John L. Wheeler.
By Elliott & Ammen
Attorneys

Inventor:
John L. Wheeler:
By Elliott & Ammen
Attorneys.

Feb. 16, 1926.

J. L. WHEELER 1,573,209

GOVERNOR FOR MEASURING AND COST COMPUTING MACHINES

Filed July 7, 1921   3 Sheets-Sheet 3

Inventor:
John L. Wheeler
By Elliott & Thurman
Attorneys.

Patented Feb. 16, 1926.

1,573,209

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

GOVERNOR FOR MEASURING AND COST-COMPUTING MACHINES.

Application filed July 7, 1921. Serial No. 482,981.

*To all whom it may concern:*

Be it known that I, JOHN L. WHEELER, a citizen of the United States, residing in the city of St. Louis and State of Missouri, have invented new and useful Improvements in Governors for Measuring and Cost-Computing Machines, of which the following is a specification.

This invention relates to fabric measuring and cost computing machines such as used by salesmen for measuring cloth, ribbon, etc. These machines include in their construction the indicating mechanism which indicates the length of the piece measured and which also carries computed figures indicating the charge to be made at different rates, for the piece measured. The machines also usually include a clutch through which the indicating mechanism is driven from the measuring roller which comes into direct contact with the fabric when it is pulled through the machine. After the measuring operation is completed the clutch is then opened and the indicating mechanism returns automatically to its zero position. This return movement to zero is usually effected by means of a spring and consequently there is a tendency for the mechanism to "race," and develop a speed of movement which would be dangerous to the mechanism. This danger arises largely from the fact that the indicating mechanism is stopped suddenly by an automatic movement when it arrives at the zero position. The computed figures indicating the charges to be made are usually carried on a flexible chart or web which is wound automatically onto a take-up roller during the measuring movement. The arrest of the indicating mechanism at the zero position suddenly arrests the rotation of a take-up roller from which the chart is unwinding. In order to prevent the racing of the indicating mechanism a centrifugal governor is provided which operates automatically to reduce the speed if it tends to rise above a dangerous point, and the general object of the present invention is to provide a driving connection to this governor which will operate to permit the continued movement of the governor after the indicating mechanism has been stopped at the zero position. In this way the stop mechanism merely arrests the indicating mechanism without stopping the centrifugal governor. By this means the necessity for absorbing the momentum of the governor weights is avoided and no serious shock to the mechanism is produced by stopping the indicating mechanism at the zero position.

Further objects of the invention will appear hereinafter.

The invention consists in the novel features, and in the general combination of parts to be particularly described hereinafter, all of which contribute to produce a simple and efficient governor for a measuring and cost computing machine. A preferred embodiment of my invention will be particularly described in the following specification, while the broad scope of my invention will be pointed out in the appended claims.

The machine comprises a casing 1 provided on its upper side with a window 2 through which numbers on a chart 3 (see Fig. 3) are visible. Adjacent to this window a scale 4 is provided which carries numbers indicating different prices per yard of the fabric or material to be measured.

Figure 1:
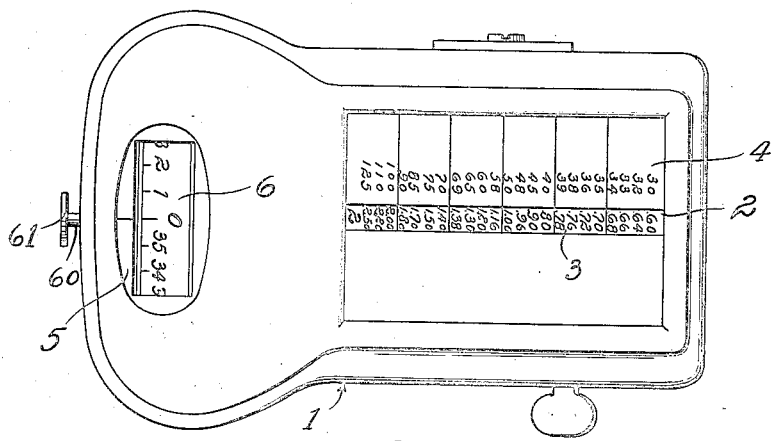
Figure 1 is a plan of the machine embodying my invention.

The upper side of the casing has another window 5 through which a large measuring wheel 6 is visible. The periphery of this measuring wheel is divided into thirty-six equal divisions numbered from 1 to 36 to indicate inches. It may also bear numbers indicating yard fractions. The chart 3 carries near one margin a series of numbers such as the number "2" (see Fig. 1) which will indicate the number of yards that the machine has measured.

Figure 3:
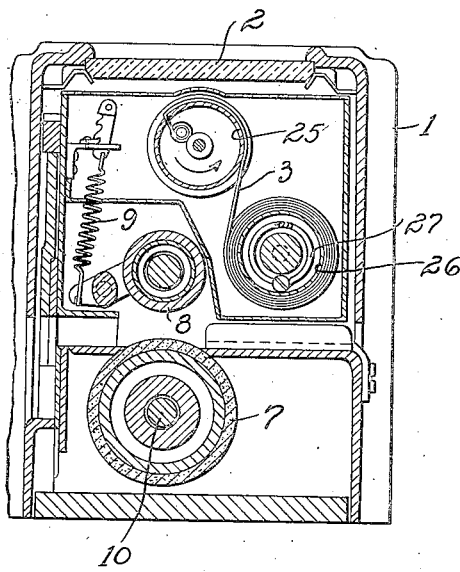
Figure 3 is a cross section through the instrument taken about on the line 3—3 of Figure 2.
Figure 5:
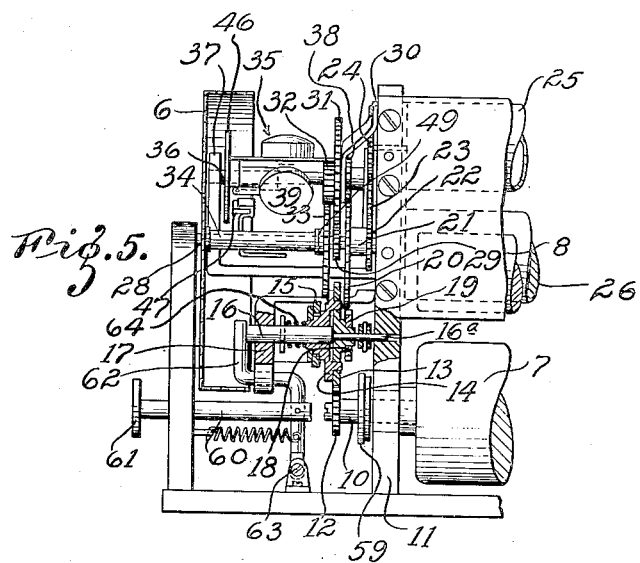
Figure 5 is a side elevation of the machine with the casing removed, certain parts being broken away and others being shown in section.

In using the machine the cloth is inserted in the usual manner between a measuring roller 7 and a presser roller 8 (see Figures 3 and 5). In these figures the presser roller is represented as raised but in operation the roller is let down so that it presses the fabric against the face of the measuring roller through the agency of a coil spring 9 (see Figure 3). The measuring roller 7 has a shaft 10 which supports the measuring roller in a vertical frame plate 11 (see Figure 5) and this shaft carries a pinion 12 which meshes with a gear wheel 13 carried on a fixed clutch member 14 (see Fig. 5). This clutch member is held against shifting by means of a small bracket plate 15 and it is carried on a clutch shaft or stem 16 the inner end of which is mounted to slide in the frame plate 11 and the other end of which is mounted to slide in a bracket 17. Co-operating with the clutch member 14 a sliding clutch member 18 is provided carried on the clutch shaft 16 and this clutch member carries a pinion 19 which meshes with a large gear wheel 20.

From the gear wheel 20 movement is imparted to the chart 3 and to the large measuring wheel 6. I shall now describe the driving train, or driving mechanism which effects the driving of the chart 3. The gear wheel 20 is rigid on a sleeve 21 the inner end of which carries a pinion 22 and this pinion 22 meshes with an idler 23 mounted on the face of the frame plate 11 and meshing on its upper side with a gear wheel 24 which is rigidly attached to the shaft of the take-up roller 25. This will rotate the take-up roller in the direction indicated by the arrow in Fig. 3 and operates to wind the chart 3 onto the take-up roller and off of a supply drum or roller 26 on which the chart is normally wound. Associated with this drum or roller 26 I provide a spring 27 which tends to rotate the drum 26 in a direction to maintain the chart taut and opposite the winding movement of the take-up roller. This spring also operates to return the chart to zero after the measuring movement. It also operates to return the measuring wheel 6 to zero.

Figure 4:
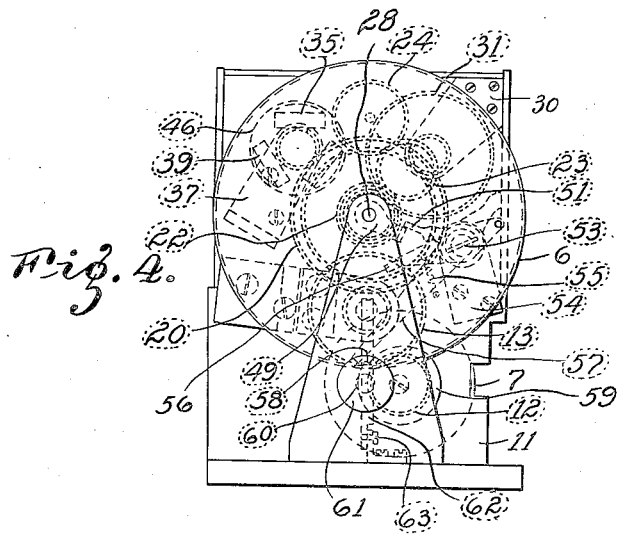
Figure 4 is an elevation of the instrument with the casing removed and looking at the left end of the machine as shown in Figure 2.

I shall now describe the driving train or driving mechanism which drives the measuring wheel 6. The aforesaid sleeve 21 is rigidly mounted on an inner shaft 28 which also carries a rigid pinion 29 (see Fig. 5). On a bracket 30 (see Figures 4 and 5) a gear wheel 31 is mounted which is rigid with a pinion 32. The pinion 32 meshes with a large gear wheel 33 that is loose on shaft 28. Shaft 28 carries rigidly measuring wheel 6 and also carries a loose sleeve 34.

Figure 6:
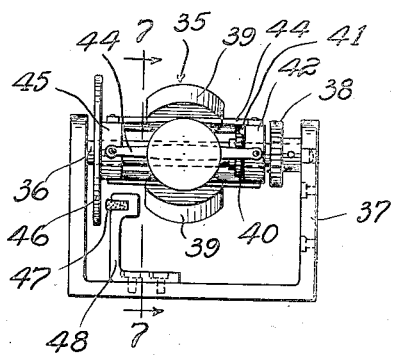
Figure 6 is a side elevation of the governor mechanism, showing the same removed from the machine.
Figure 7:
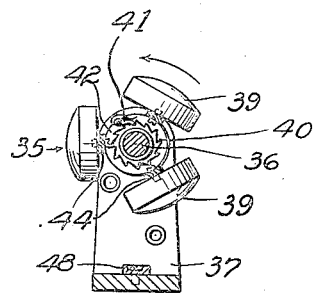
Figure 7 is a vertical section through the governor taken on the line 7—7 of Figure 6.
Figure 2:
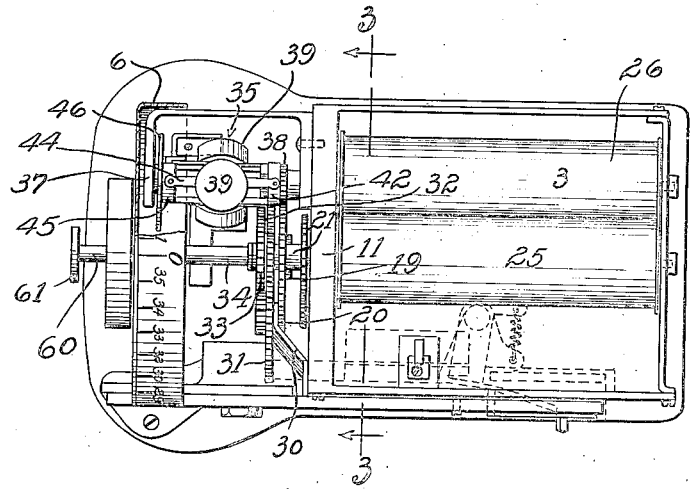
Figure 2 is a plan of the mechanism of the instrument with the casing removed.

When the indicating mechanism is being returned to zero by the spring 27 (see Fig. 3) a rotary movement is imparted to a governor device 35 (see Figs. 2, 6 and 7). The shaft 36 of this governor is mounted in a suitable bracket 37 and carries a pinion 38 which meshes with the aforesaid large gear wheel 20. The governor comprises centrifugal weights 39 which are driven through a one-way drive connection from the shaft 36. This drive connection may comprise a ratchet wheel 40 rigidly secured to the shaft 36 and engaged by a spring-pressed pawl 41 carried on a collar 42. This collar 42 is connected by three spring bars 44 with a collar 45 which is also loose on the shaft 36. The collar 45 carries a brake disk 46. Now when the speed of the mechanism in returning to zero rises to a dangerous point, the governor weights 39 fly outwardly and produce a slight bow or outward bend in the bars 44, and this causes a shifting movement of the collar 45 toward the right as viewed in Fig. 6 and will bring the disk 46 up against a brake shoe 47 carried in a small bracket 48 attached to the bracket 37. Furthermore it should be understood that the direction of rotation of the ratchet wheel 40 is that indicated by the arrow in Fig. 7, and hence when the ratchet wheel is stopped at the zero position of the indicating mechanism the governor weights can go on revolving harmlessly, the pawl 41 simply slipping over the inclined teeth of the ratchet wheel 40.

Figure 8:
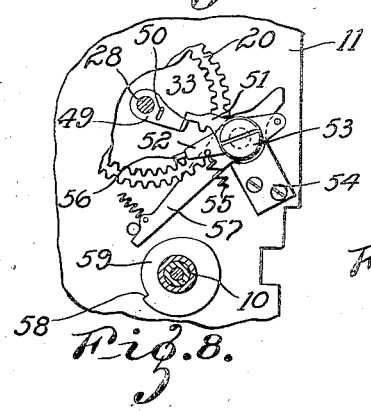
Figure 8 is a detail elevation and partial section illustrating the relation of parts of the stop mechanism.
Figure 9:
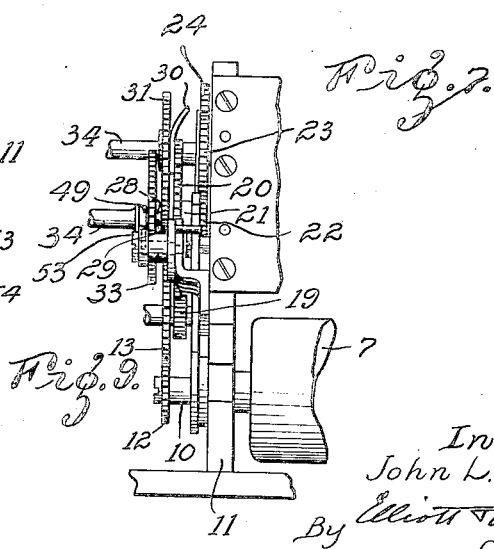
Figure 9 is a side elevation illustrating details of the stop-mechanism, certain parts being broken away.

Any suitable stop mechanism may be provided for arresting the indicating mechanism in the zero position after its returning movement is completed. Before proceeding to a detail description of the stop mechanism it should be stated that the ratios of the gear wheels are such that the gear wheel 33 will make one complete revolution when the machine has measured to its full capacity, for example, ten yards or twelve yards. This gear wheel controls the stopping of the machine at the limit of its measuring movement and also controls the stopping of the indicating mechanism at zero after the returning movement is completed. I, therefore, call this gear wheel the controller wheel. Loose on the inner shaft 28 I provide an arm 49 (see Figure 8) which is connected by a pin and slot connection 50 with the face of the controller wheel 33. Hence this arm rotates with the controller wheel but is capable of a slight motion with respect to the controller wheel. Adjacent to the edge of the controller wheel 33 I provide a trigger 51 which projects into the path of the upturned end of the arm 49. This trigger 51 is rigid with a dog 52 and with the dog is pivotally mounted on a pivot screw 53 carried on a bracket 54 attached to the vertical frame plate 11. A coil spring 55 attached to the dog normally holds the dog just out of the path of a stop 56 on the face of the controller wheel. However, just as the indicating mechanism arrives at the zero position the arm 49 will engage the trigger 51 and thereby rotate the dog 52 into the path of the stop 56. This will stop the indicating mechanism in the zero position. At the limit of the measuring capacity of the machine the arm 49 also actuates the trigger 51 to move the locking lever 57 into engagement with a shoulder 58 on a stop disk 59 carried by the shaft 10 of the roller 7, but the details of this mechanism are immaterial as they do not co-operate with the governor mechanism; but it should be understood that the dog 52 does co-operate with the governor and indicating mechanism to arrest the indicating mechanism at zero, following which the governor continues its rotation independently of the indicating mechanism, until the momentum of the rotating weights 39 is absorbed by the friction of the governor.

The clutch composed of the clutch members 14 and 18 may be opened at will by shoving on the head 61 of a stem 60. This head 61 is exposed on the exterior of the casing (see Figure 1). The inner end of the stem is pivotally attached to an S-shaped arm 62 pivoted at 63 and the end of which presses against the end of the clutch shaft 16. The clutch shaft 16 carries a spring 64 which returns the clutch shaft 16 toward the left after the clutch has been opened. In other words, this spring 64 will hold the clutch closed, it being understood that the clutch member 18 is rigid with the shaft 16, that is to say, it is rigid with the reduced inner extension 16ᵃ of this shaft which slides in the vertical frame plate 11.

I shall now briefly describe the general mode of operation of the machine.

By pulling the fabric to be measured between the measuring roller 7 and the pressure roller 8, the pinion 12 (see Figure 5) through the gear wheel 13 and the clutch 14, 18 drives the pinion 19. This pinion in turn drives the large gear wheel 20 which is rigid with pinion 22, being on the same sleeve 21 which is rigidly secured to the shaft 28. The rotation of pinion 22 is imparted through an idler 23 (see Fig. 4) to the gear wheel 24 carried on shaft of the take-up roller 25. This winds up the chart 3 and unwinds it from the supply drum or roller 26 (see Fig. 3).

The operator of the machine observes the length indicating figures such as the number "2", (see Figure 1) which will appear at the lower edge of the chart 3; the inches or yard fractions will be indicated by the measuring wheel 6. When the desired quantity has been measured, the operator can read the computed figure which indicates the charge to be made for the amount measured, at any of the price rates indicated on the scale 4. The length of fabric can then be marked and cut off at the desired point. The clutch stem 60 is then operated by pressing it on its head 61 and this opens the clutch 14, 18. The spring 27 within the chart drum 26 returns the chart to zero. This returning movement, of course, effects a backward rotation of the gear wheel 24 which is rigid with the take-up roller 25, and the rotation of the gear wheel 24 is imparted to the measuring wheel 6 because the shaft 28 carrying the measuring wheel will rotate with its rigid pinion 22.

Motion will be imparted to the governor mechanism 35 by the large gear wheel 20 which meshes with and rotates the pinion 38 of the governor (see Figures 2 and 6).

The controller wheel 33 is driven from the pinion 29 on the shaft 28 through the gear wheel 31 and pinion 32 (see Figure 5). As the indicating mechanism arrives at zero the arm 49 strikes the trigger 51 (see Fig. 8) and throws the dog 52 into the path of the stop 56. This stops the indicating mechanism at zero. When this occurs the governor weights 39 will continue to rotate in the direction of the arrow in Fig. 7 while the pawl 41 runs freely over the teeth of the ratchet wheel 40.

As the indicating mechanism is returning to zero racing of the mechanism is prevented by the brake disk 46 which will come into contact with the brake shoe 47 (see Fig. 6) if its speed rises too high.

It is understood that the embodiment of the invention described herein is only one of the embodiments my invention may take, and I do not wish to be limited in the practice of my invention, nor in my claims, to the particular embodiment set forth.

What I claim is:

1. In a machine of the character described, having indicating mechanism, means for returning the indicating mechanism to zero, a governor brake connected with the indicating mechanism and having weights affected by centrifugal force, means for stopping the indicating mechanism at zero, and means for effecting a disconnection between the governor and the indicating mechanism to avoid the shock of stopping the governor.

2. In a measuring machine having gearing adapted to be returned after a measuring operation, to a fixed position under power, a governor for controlling the speed of the return of the gearing comprising a shaft operated by the gearing, a frame rotatably mounted on the shaft carrying weights adapted to move out under the action of centrifugal force and brake mechanism rendered effective by excessive displacement of said weights, a ratchet wheel on said shaft and a pawl on said frame adapted to be engaged by the ratchet wheel to rotate the frame and weights whereby, when the motion of the governor shaft is arrested by stoppage of said gearing, the governor frame and weights may continue to freely rotate on said shaft.

In testimony whereof, I have hereunto set my hand.

JOHN L. WHEELER.